Patented Feb. 9, 1943

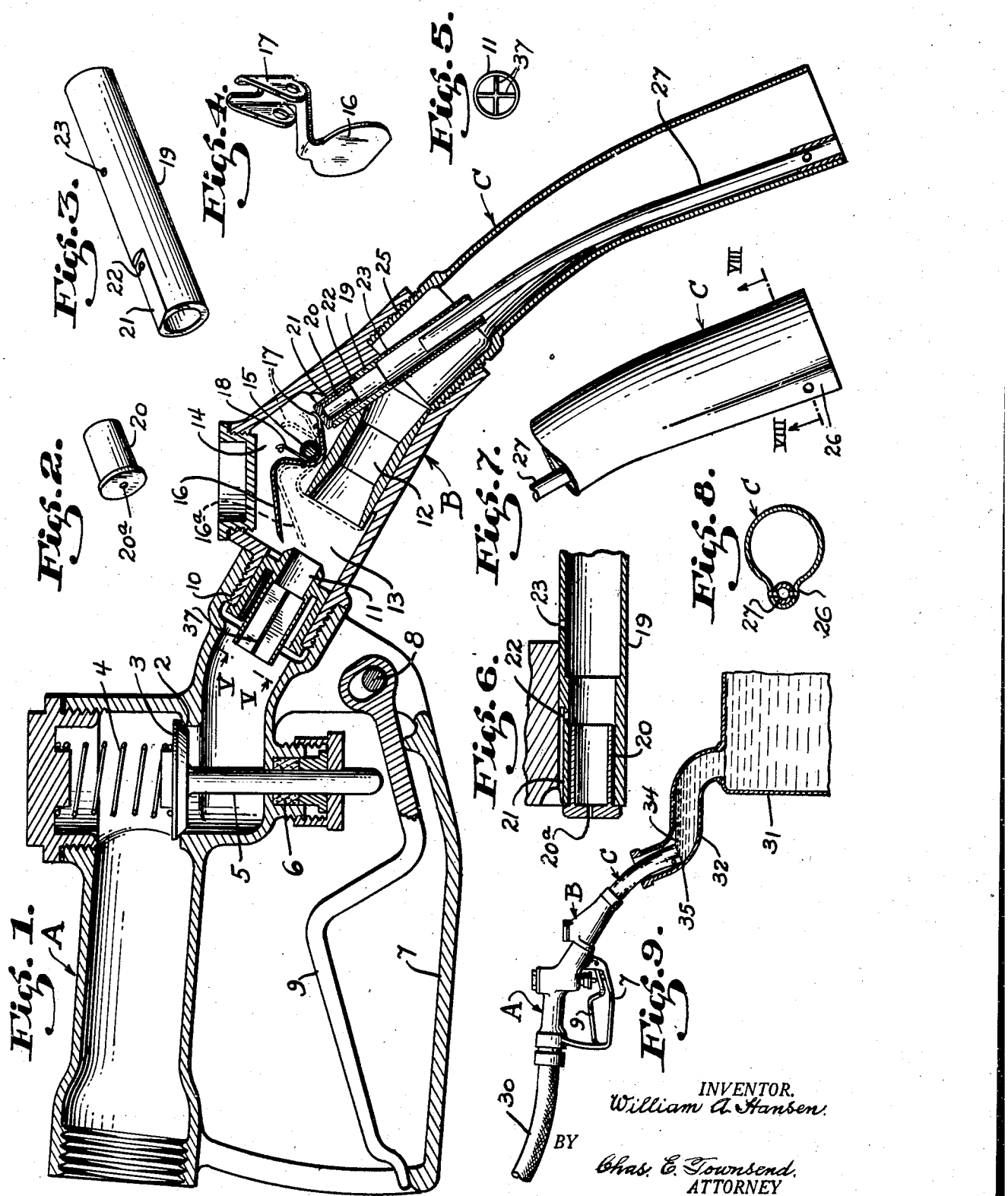

2,310,631

UNITED STATES PATENT OFFICE 2,310,631

AUTOMATIC SHUTOFF VALVE FOR FILLING SPOUTS

William A. Hansen, Dos Palos, Calif.

Application August 20, 1940, Serial No. 353,363

4 Claims. (Cl. 226—127)

This invention relates to a filling spout such as used on the end of a hose, for instance in gasoline service stations or the like, and especially to means for automatically closing or shutting off the flow of liquid through the spout when a predetermined liquid level is reached in the tank or other container to be filled. The present invention is an improvement over the structure shown in my former Patent No. 1,930,954, entitled "Automatic shutoff for filling spouts," issued October 17, 1933.

The patent referred to discloses a valve housing adapted to be attached to the end of a hose line and function as a filling spout. The housing contains two valves, a main shutoff valve and an automatic valve. The main shutoff valve is adapted to be opened and closed by manual means, while the automatic valve is actuated by a float, so that when a predetermined liquid level is obtained the float rises and closes the automatic valve, thereby shutting off the flow of liquid through the spout. The automatic valve functions only as a temporary shutoff, and as a warning device for the operator; that is, the automatic valve closes with an impact action of sufficient force to warn the operator, as the impact can be both heard and felt, and when the operator is thus warned he manually closes the main shutoff valve.

The present invention provides a housing terminating in a filling spout; in addition thereto it employs a main shutoff valve and an automatic valve, arranged substantially as in my former patent, but improvements are embodied which simplify the structure and insure a more positive operation.

These improvements are described in complete detail in the accompanying specification, and are shown by way of illustration in the accompanying drawing, in which—

Fig. 1 is a central vertical longitudinal section through the valve housing and the mechanism container therein;

Fig. 2 is a perspective view of a piston;

Fig. 3 is a perspective view of the cylinder in which the piston is mounted;

Fig. 4 is a perspective view of the automatically actuated shutoff valve;

Fig. 5 is an end view of the primary aspirating tube, taken on line V—V of Fig. 1;

Fig. 6 is an enlarged view of the cylinder and piston shown in Figs. 2 and 3, the cylinder being partially broken away;

Fig. 7 is a side elevation of the lower end of the discharge spout;

Fig. 8 is a cross section taken on line VIII—VIII of Fig. 7; and

Fig. 9 is a side elevation, partially in section, showing the position assumed by the filling spout when filling a tank or similar container.

Referring to the drawing in detail, and particularly to Fig. 1, it will be noted that the automatic shutoff valve and the spout attached thereto are composed of three separable sections, generally indicated at A, B and C. The section A comprises a housing having a valve seat 2 formed therein, upon which is mounted a valve 3 normally held in closed position by a spring 4. The valve is provided with a stem 5 which projects through a stuffing box 6. Formed on the housing, on the lower side thereof, is a hand-grip 7, and pivotally attached thereto, as at 8, is a lever 9 which is manually controlled by the operator. This lever, when gripped and pulled towards the housing A, engages the stem 6 and opens the valve against the tension of the spring 4. Conversely, when the lever is released it returns to the position shown in full lines in Fig. 1, and the valve is closed by means of the spring 4.

Section B similarly comprises a housing, which may be attached to the housing indicated at A by a screw coupling 10, or any other suitable connection. Insertable in the end of the housing adjacent the discharge side of the valve 3 is a primary nozzle 11; also secured or insertable in the housing is a secondary nozzle 12. The nozzles are spaced apart, as shown at 13, and form what is generally termed an "aspirator." A chamber 14 formed in the housing communicates with the space 13 between the nozzles, and a partial vacuum is formed in said chamber when the device is in operation, as will hereinafter appear. Pivotally mounted as at 15 within the chamber 14 is an automatic shutoff valve 16 (see Figs. 1 and 4). This valve is provided with an arm 17, and it is also provided with a spring 18, which normally maintains the valve in the full open position shown in full lines in Fig. 1.

Suitably secured in the housing B is a cylinder 19, and slidably mounted in the upper end thereof is a piston or plunger 20, the function of which will hereinafter be described. The cylinder serves two main functions: First, that of a container or support for the piston or plunger 20, and secondly, that of a bleeding or venting device for the chamber 14. That is, a flattened portion 21 is formed on the exterior surface of the cylinder, adjacent the upper end thereof. A vent passage is formed at 22, and a second vent passage at 23. Their function will later be described.

The lower end of the housing B is provided with a threaded extension 25, and into this screws a nozzle C. This nozzle is slightly flattened near its lower end, as shown at 26, and soldered, welded, or otherwise secured in the flattened portion is a tube 27 which extends upwardly through the nozzle and into the lower end of the cylinder 19. A loose fit or play is maintained between the upper end of the tube 27 and the cylinder 19, as this permits ready application or removal of the nozzle C, and it also provides a venting passage, as will hereinafter appear.

The lower end of the tube 27 is open, and is flush with the end of the nozzle C. A hole is drilled crosswise of the flattened portion 26 of the nozzle and through the tube 27. This hole is disposed some distance above the lower end of the nozzle, and serves as a venting passage, as will hereinafter appear.

In actual operation, it will be obvious that valve 3 is manually opened and closed, and that it normally maintains a closed position due to the action of the spring 4. It should similarly be obvious that valve 16 normally assumes an open position, as it is held in this position by the spring 18. The valve mechanism as a whole will be attached to a hose line such as shown at 30, and gasoline or other liquid to be dispensed may be delivered thereto by gravity, by pump action, or otherwise. If a gasoline tank 31 is to be filled (see Fig. 9), the nozzle is inserted in the filling tube 32 of the tank, and the only operation on the part of the attendant will be that of grasping the lever 9 and pulling it toward the valve housing A, so as to open the valve 3 and retain it open. The moment the valve is open, gasoline will flow past the valve and through the primary nozzle 11 of the aspirator. Its velocity will be sufficient to carry it across the space or gap 13 into the nozzle 12, and from there it will flow down through the spout C and into the tank. If the purchaser requires, for instance, five gallons, the attendant will watch the gasoline meter in the usual way and will release the handle 9 the moment five gallons is registered, thus shutting off the supply or flow through the nozzle. On the other hand, if the person purchasing the gasoline requests that the tank be filled, the attendant will again perform the same operation; that is, he will insert the nozzle in the filling tube 32 of the tank, he will grasp the lever and open the valve 3, and will retain it open. As the gasoline passes through the primary and secondary nozzles of the aspirator, a partially evacuated condition will be established in the chamber 14, and as the tube 27 and the cylinder 19 are in communication with the chamber 14, air from the tank will flow up through the tube and the cylinder, then through the vent 22 and the passage formed by the flattened portion 21, into the chamber. It should also be noted that the piston or plunger is provided with a vent as shown at 20a; hence, air will also pass through the plunger and into the chamber.

There are two reasons for maintaining this air flow. First of all, it is necessary to relieve or control the partial vacuum formed in the chamber 14, as the latter would otherwise gradually increase and finally reach a point where the piston or plunger 20 would be pulled inwardly into the chamber against the tension of the spring 18. This must not happen except under certain conditions hereinafter to be specified. Secondly, it is essential that a continuous air flow or slightly evacuated condition be maintained in the tube 27 and the cylinder 19, as this condition is depended upon to withdraw gasoline from the tank when a desired level or content is reached. This withdrawal of gasoline is depended upon to actuate the piston 20, and this is accomplished as follows:

When a tank 31 is being filled, and the gasoline level finally reaches the point indicated at 34 (see Fig. 9), gasoline will immediately enter the lower end of the tube 27 and will travel at high velocity upwardly through said tube and the cylinder 19, and will strike the piston 20 with considerable force or impact. The piston will thus move upwardly in the cylinder, or into the chamber 14, and as such, will engage the lever 17 of valve 16 and swing it from the full line position shown in Fig. 1 to the dotted line position indicated at 16a. At this point the valve will be engaged by the jet of gasoline discharging across the gap 13 from the primary nozzle 8, and when the valve is thus struck it will be forcibly swung to closed position, or into engagement with the upper end of the secondary nozzle 12. This action is rapid, and the seating of the valve 16 against the secondary nozzle may be termed an impact seating, due to the rapidity of movement. Also, the flow of gasoline through the hose, the housing A, and the nozzle 11 is substantially instantaneously stopped, and a surge or impact flow is not only heard but is distinctly felt by the operator, and when thus warned the operator immediately releases the lever 9, thereby permitting the valve 3 to be closed by the spring 4. The closing of the valve 3 is cushioned by the liquid trapped by the closing of the valve 16, and this is desirable as it relieves the pump and metering mechanism of any shock. The moment valve 16 is automatically closed and the valve 3 is closed by release of the lever 9, further creation of vacuum is stopped, as the flow through the nozzles 11 and 12 is stopped. Also, air will enter through the passage 23, and through the loose connection between the upper end of the tube 28 and the lower end of the cylinder 19, and this air will pass through the vents 22 and the vent 20a in the piston. The vacuum in chamber 14 is thus relieved, and the spring 18 will return the valve 16 to open position. The gasoline trapped in the space 13 and in the chamber 14 will immediately be released, and will discharge through the spout C. Similarly, any gasoline remaining in the cylinder 19 and tube 27 will be released and discharged.

The venting action after closing of the valves 16 and 3 is almost instantaneous, and so is the opening of the valve 16. Thus, little time is lost by the attendant in draining the nozzle after the gasoline flow has been shut off.

Most modern cars now in use mount the gasoline tank at the rear end of the car, and bring the filling tube 32 of the tank through the fender, the upper end being provided with a filling cap which is removed when the tank is to be filled. The filling tube 32 is usually curved, as shown in Fig. 9, and when the spout C is inserted it rests on the bend of the tube, at the point shown at 35. Hence when the valve is open, the gasoline tends to splash, due to impact with the surface of the filling tube. It is for this reason that the cross-passage or auxiliary vent at the lower end of the tube 27 is employed. That is, when the gasoline is splashing, it would have a tendency to enter the lower end of the tube 27 the moment a partial vacuum was formed therein, and thereby trip the valve 16, but by providing the auxiliary vent at a higher elevation, or above the point of splash, there is no danger of accidentally carrying gasoline up through the tube except when the tank is filled.

To make the primary nozzle 11 as efficient as possible, vanes 37 are placed in the upper end thereof, as shown in Figs. 1 and 5. These guide the liquid in the usual way and prevent excess spreading of the liquid when it discharges from the end 11 of the nozzle, thereby increasing the general efficiency of the aspirator.

While these and other features of my invention have been more or less specifically described and illustrated, I nevertheless wish it understood that changes may be resorted to within the scope of the appended claims, and that the materials and finish of the various parts employed may be according to the wishes of the manufacturer or according to varying conditions of use.

Having thus described my invention, what I claim and desire to secure by Letters Patent is:

1. A device of the character described comprising a housing having an inlet at one end and a discharge spout at the other, for conducting liquid to a receptacle a manually operated valve controlling the flow of liquid, a pair of cooperating aspirating nozzles disposed within the housing, a chamber formed within the housing in which a partial vacuum is formed when a liquid flow is established through the nozzles, an automatically actuated valve within the housing and normally open, said automatically actuated valve when closed stopping liquid flow through the nozzles, means through which the vacuum maintained in the chamber is effective for withdrawing liquid from the receptacle when a desired liquid level has been reached, and means actuated by the withdrawn liquid for closing the automatically actuated valve.

2. A device of the character described comprising a housing having an inlet at one end and a discharge spout at the other, for conducting liquid to a receptacle, a primary and a secondary cooperating aspirating nozzle disposed within the housing, said nozzles being longitudinally spaced apart, a chamber formed in the housing in communication with the spaced nozzles and in which a partial vacuum is formed when a liquid flow is established through the nozzles, a pivoted valve in said chamber disposed between the nozzles, said valve being normally maintained in an open position and said valve when closed engaging one end of one of the nozzles to stop liquid flow therethrough, means through which the vacuum maintained in the chamber is effective for withdrawing liquid from the receptacle when a desired liquid level therein has been reached, and means actuated by the withdrawn liquid for swinging the valve to closed position.

3. A device of the character described comprising a housing having an inlet at one end and a discharge spout at the other, for conducting liquid to a receptacle, a primary and a secondary cooperating aspirating nozzle disposed within the housing, said nozzles being longitudinally spaced apart, a chamber formed in the housing in communication with the spaced nozzles and in which a partial vacuum is formed when a liquid flow is established through the nozzles, a pivoted valve in said chamber disposed between the nozzles, said valve being normally maintained in an open position and said valve when closed engaging one end of one of the nozzles to stop liquid flow therethrough, an auxiliary passage formed in the spout extending from the end of the spout to the chamber, adapted to draw liquid from the receptacle up into the chamber when a desired liquid level has been reached, and means actuated by liquid entering said auxiliary passage for automatically moving the valve to a closed position.

4. A device of the character described comprising a housing having an inlet at one end and a discharge spout at the other, for conducting liquid to a receptacle, a primary and a secondary cooperating aspirating nozzle disposed within the housing, said nozzles being longitudinally spaced apart, a chamber formed in the housing in communication with the spaced nozzles and in which a partial vacuum is formed when a liquid flow is established through the nozzles, an auxiliary passage formed in the spout extending from the end of the spout to the chamber, a valve in the housing adapted to engage one end of one of the aspirating nozzles to stop liquid flow therethrough, means normally maintaining the valve in an open position to permit liquid flow, a cylinder formed in said auxiliary passage, a piston mounted therein, said piston being movable and engageable with the valve to move it from an open to a closed position, and said piston being actuated by liquid entering the auxiliary passage, due to the suction maintained therein, when a desired liquid level has been reached in the receptacle.

WILLIAM A. HANSEN.